United States Patent [19]

Mitchell et al.

[11] Patent Number: 5,023,599
[45] Date of Patent: Jun. 11, 1991

[54] THROTTLE POSITION SENSOR ADVANCED BRAKE LIGHT DEVICE

[75] Inventors: Steven R. Mitchell, Niles, Mich.; Vernon M. Daly, Jr., Mishawaka, Ind.

[73] Assignee: CTS Corporation, Elkhart, Ind.

[21] Appl. No.: 370,591

[22] Filed: Jun. 22, 1989

[51] Int. Cl.5 .............................. B60Q 1/50
[52] U.S. Cl. .................... 340/467; 340/463; 340/464; 340/479
[58] Field of Search ............... 340/467, 463, 464, 479, 340/429, 669; 200/61.45 R

[56] References Cited

U.S. PATENT DOCUMENTS

| | | | |
|---|---|---|---|
| 3,528,056 | 9/1970 | Voevodsky | 340/467 |
| 3,601,794 | 8/1971 | Blomenkamp | 340/467 |
| 3,794,972 | 2/1974 | Van Ostrom | 348/467 |
| 3,846,749 | 11/1974 | Curry | 340/467 |
| 3,911,394 | 10/1975 | Shames | 340/467 |
| 4,097,842 | 6/1978 | Zalar et al. | 340/467 |
| 4,107,647 | 8/1978 | Yoshino | 340/467 |
| 4,173,012 | 10/1979 | Burser | 340/467 |
| 4,357,594 | 11/1982 | Ehrlich et al. | 340/467 |
| 4,772,868 | 9/1988 | Chen | 340/467 |
| 4,841,276 | 6/1989 | Abel et al. | 340/467 |

Primary Examiner—Donnie L. Crosland
Attorney, Agent, or Firm—Albert W. Watkins

[57] ABSTRACT

An advanced brake light signalling apparatus utilizes an output from a potentiometric position sensor, buffers the output, differentiates the buffered signal, compares the differentiated signal with a reference, and depending upon the results of the comparison activates the brake lights of a vehicle for a minimum time period. The position of the accelerator at the time of initiation of motion may be utilized to adjust the reference to which the differentiated signal is compared.

3 Claims, 2 Drawing Sheets

THROTTLE POSITION SENSOR ADVANCED BRAKE LIGHT DEVICE

BACKGROUND OF THE INVENTION

1. Field of the Invention

This invention relates generally to early warning brake lighting systems and specifically to a system which utilizes a signal from a throttle position sensor.

2. DESCRIPTION OF THE RELATED ART

Automobiles have developed through time from the original models which were barely able to exceed human walking speed to where relatively enormous velocities are attainable and commonplace. Accompanying this development of faster cars has been a requirement for better notification of relative changes of movement between vehicles to reduce the likelihood of collisions therebetween. Perhaps the most basic of these systems is the turn signal in which a driver is able to activate a flashing amber light to signal to surrounding drivers an intention to make a change in the direction the vehicle is taking.

Additional lighting systems have evolved which are more automatic due to the nature of the change being signalled. The present standard brake lights are exemplary. In operation a driver will apply pressure to the brake pedal and activate some type of switch which in turn energizes tail lights on the vehicle. Observance of the tail lights provides a signal to all following motorists that the vehicle is braking.

While the brake light provides warning to following motorists, with increasing velocities and greater congestion on the thoroughfares, CTS-641, Throttle Position Sensor Advanced Brake Light Device there is not always sufficient warning provided to trailing motorists of the braking of a leading vehicle. The time required for response by a trailing motorist includes reaction time of the leading motorist, travel time by the leading motorist's foot from the accelerator pedal to the brake pedal, and reaction time of the trailing motorist. In an environment where numerous rear-end collisions are occurring daily, including some of extremely serious consequence, anything which can be provided to reduce the total time for response by the trailing motorist is beneficial.

Currently, the automotive industry is providing rear window (third) brake lights which improve visibility of the light and allow for viewing from a trailing car not only to an immediately leading vehicle, but often to a second or further leading vehicle. Studies have illustrated a reduction in rear-end collisions with the utilization of the third light However, in view of the large number of rear-end collisions where time was insufficient for braking by a trailing vehicle, clearly there exists a need for a product which will increase that warning time.

Prior art systems to automatically provide more advanced warning of deceleration have included accelerometers which sense the acceleration of the vehicle and light the brake lights responsive to deceleration. Other systems have included switches mounted onto or in the proximity of the accelerator pedal and linkage to sense rapid movement of the accelerator in a decelerating manner. Some other prior art systems have sensed pressure or force applied to the accelerator pedal to detect rapid reduction in force, as might be experienced in an emergency movement away from the accelerator.

Each of the prior art systems suffer from disadvantages which are too substantial to elicit widespread acceptance of the devices in spite of the statistically significant safety enhancement available CTS-641, Throttle Position Sensor Advanced Brake Light Device from implementation. The prior art accelerometers tend to be sensitive to random road vibration, and in some instances, to the incline of the roadway upon which the vehicle is traveling. Additionally, the response time gained from the prior art accelerometers is questionable, since the vehicle must be already decelerating beyond a minimum threshold to activate the device. If this threshold is too great, no advance warning is provided since the brakes must already be applied to activate the device. If the threshold is too low, transmission shifting and road irregularities will activate the device.

Prior art pressure and force sensors offer advanced warning through the necessary time required for a lead motorist to release pressure from the accelerator and then apply a pressure to the brake pedal sufficient to activate the brake light. This is the travel time of the lead motorist's foot referred to earlier. However these prior art sensors suffer from complications occurring around the accelerator pedal and linkage. Many accelerator pedal sizes and shapes are available. Many different methods of applying pressure to the accelerator pedal are utilized, varying between individual motorists. Finally, many different installation methods may be utilized for the sensors. In view of the varying pedal sizes and shapes, a manufacturer must make either custom models for each pedal resulting in high cost of manufacture, or the manufacturer must design a single sensor which is adaptable for custom installation by the end user. The concept of a single adaptable sensor is limiting throughout the prior art in that the sensor will disrupt the accelerator pedal to motorist connection to the significant dissatisfaction of the consumer to whom the product is being sold. Additionally, connection between the sensor and the brake lights introduces potential problems related to entanglement of the sensor with the pedal and linkage, wearing of the parts subjected to motion, and difficulty of proper installation in view of the nonCTS-641, Throttle Position Sensor Advanced Brake Light Device standard mechanical configuration of accelerators and linkages.

The prior art devices which overcome many of the aforementioned problems utilize connection to or within the accelerator linkage. These devices create new hazards for the motorists which are potentially more hazardous than the original early warning problem. Binding or lock-up of the accelerator linkage during operation will potentially take the vehicle out of control of the motorist with serious consequence. This can occur due to improper installation, mechanical wear, unintentional disruption of the device relative to the linkage, loosening with age of mechanical fasteners, and other reasons too numerous to mention.

SUMMARY OF THE INVENTION

The present invention overcomes the limitations of the prior art by utilizing a rate of change electrical detector, in combination with a variable resistance, to sense a rapid movement of the accelerator pedal in a decelerating manner. The electrical detector includes a differentiator, level detector, one-shot and relay/driver. The variable resistance is preferred to be the throttle position sensor, but may alternatively be comprised by an accelerator position sensor in those applications where the automotive maker has provided such a device.

OBJECTS OF THE INVENTION

It is an object of the invention to provide a device which will warn trailing motorists of an emergency-braking condition of a leading vehicle.

It is a further object of the invention to provide as much response time to a trailing motorists as may be reasonably possible CTS-641, Throttle Position Sensor Advanced Brake Light Device It is further object to provide a device of high reliability design.

It is further object to provide a device which does not interfere with or alter the accelerator linkage in any way.

It is a further object to provide a device which is insensitive to road conditions and vehicular inclination.

It is a further object to provide a device which is easy to install in a reliable manner.

It is a further object to provide a device which will not produce false signals.

It is a further object to provide a device which does not alter the "cockpit" surroundings of a motorist in any way after the device is installed.

It is a further object to provide a limited adjustment so that the device may be adapted to conform to the characteristics of an individual motorist and individual vehicle.

It is a further object to provide a device which adds no moving parts to vehicles equipped with the device. These and other objects are accomplished through the use of the invention and are not intended to be limiting to the scope of the invention. The invention may be best implemented through the application of the preferred embodiment described hereinbelow. CTS-641, Throttle Position Sensor Advanced Brake Light Device

DESCRIPTION OF THE PREFERRED EMBODIMENT

Figure 1:
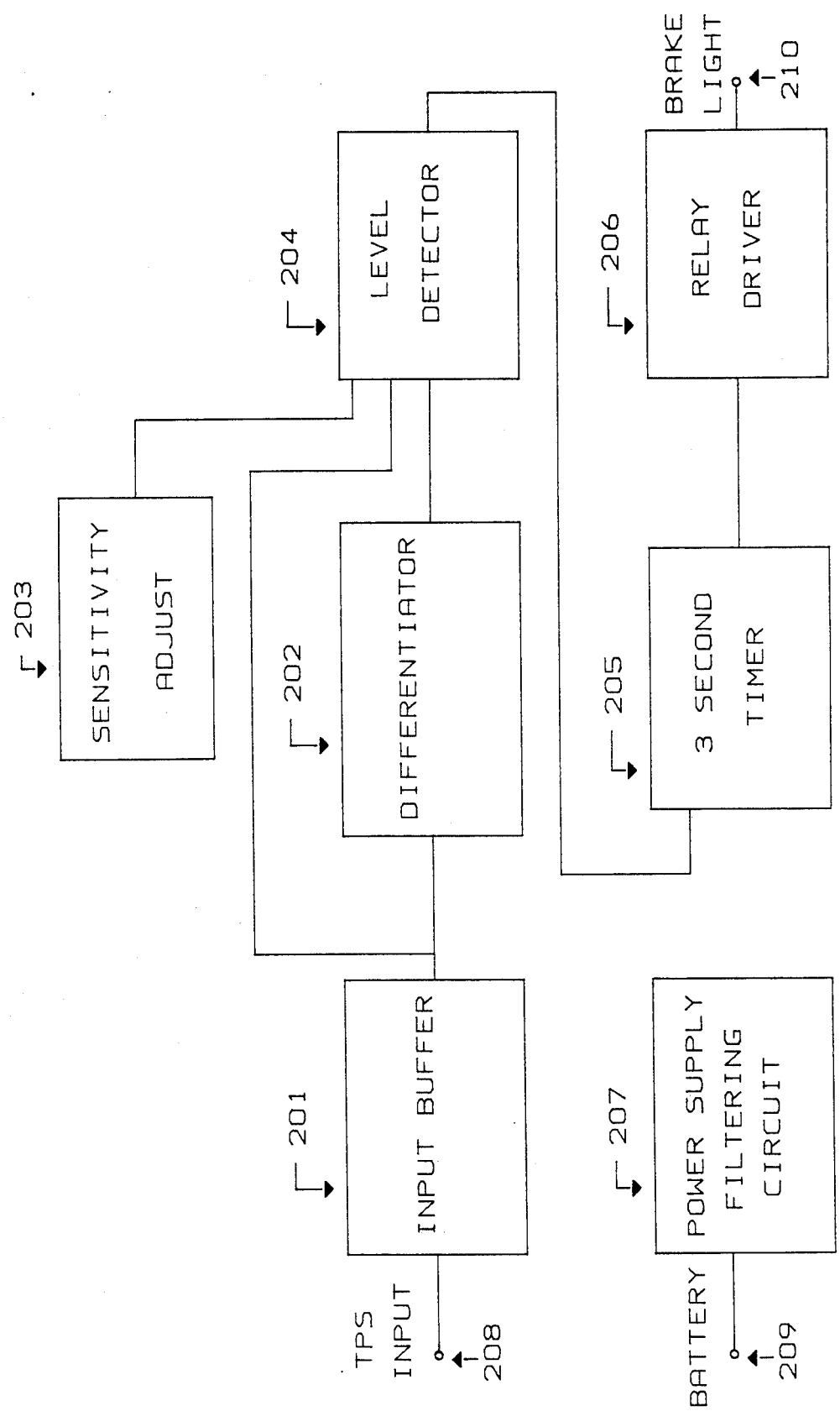
FIG. 1 illustrates the functional arrangement of the preferred embodiment by block diagram.

FIG. 1 illustrates the preferred embodiment of the present invention by relationships of various functions. Input buffer 201 receives a voltage at TPS input 208 representative of the position of the throttle of an automobile. Input buffer 201 minimizes electrical loading of the TPS source. Additionally, buffer 201 may provide noise and vibration filtering to prevent erroneous signals from activating the balance of the circuitry. The buffered TPS signal is conducted from buffer 201 to the input of differentiator 202 and simultaneously to one input of level detector 204. Differentiator 202 generates an output voltage proportional to the rate of change of the buffered TPS output from buffer 201. The output voltage from differentiator 202 is provided as an input to level detector 204. Level detector 204, in addition to receiving input from buffer 201 and differentiator 202, receives a reference voltage from sensitivity adjust 203.

The relationship between adjust 203, differentiator 202, and detector 204 will be considered first and then the additional input from buffer 201 will be considered.

Level detector 204 receives a voltage from differentiator 202 representative of the rate of change of position of the throttle. This rate of change voltage is compared with the reference voltage CTS-641, Throttle Position Sensor Advanced Brake Light Device provided by sensitivity adjust 203. When the rate of change voltage is of sufficiently large magnitude (representing rapid change in throttle position) and proper polarity (representing release of the accelerator) to exceed the reference voltage provided by adjust 203, the level detector 204 provides an output signal indicative. In turn, one second timer 205 is activated, energizing relay driver 206. Relay driver 206 then provides an output 210 sufficient to activate vehicular brake lights. The circuit is electrically powered by automotive battery through input 209 and power supply filtering circuit 207.

As described above, the preferred embodiment is fully operational without any operatively direct connection between buffer 201 and level detector 204. A voltage is received by buffer 201, converted to a signal representing rate of change by differentiator 202, compared to a reference by level detector 204, and the results of the comparison utilized by timer 205 and relay driver 206 to activate brake light output 210 when appropriate. In an emergency braking situation a motorist will rapidly release the accelerator, resulting in rapid change in the position of the throttle. When the release of the throttle is rapid enough to be representative of an emergency situation, the brake lights are activated.

False triggering is avoided, since a rapid release of the accelerator pedal is nearly always indicative of deceleration, even if not followed by braking Maximum warning is provided to trailing motorists since activation occurs simultaneous with rapid foot movement and before the driver's foot can reach the brake pedal. Slower, more normal movements do not trigger the device.

a typical accelerator linkage incorporates a return spring which provides a return force in the direction representative of deceleration. To depress the accelerator, a motorist must overcome CTS-641, Throttle Position Sensor Advanced Brake Light Device the force of the return spring. From physics, the force required to depress the spring increases with increasing depression of the accelerator. This increasing spring force also contributes to the maximum rate of change of position of the throttle position sensor. In other words, when a motorist has the throttle fully depressed, relatively large rates of change of position occur without corresponding emergency situations. The same rate of change with the throttle only partially depressed would likely represent an emergency situation. In order to compensate for the varying rates of change depending upon the throttle position just prior to release, the throttle position buffered output from buffer 201 is provided to level detector 204 for additional reference. This particular throttle angle compensation reduces the sensitivity of the level detector more as the accelerator is depressed more.

Figure 2:
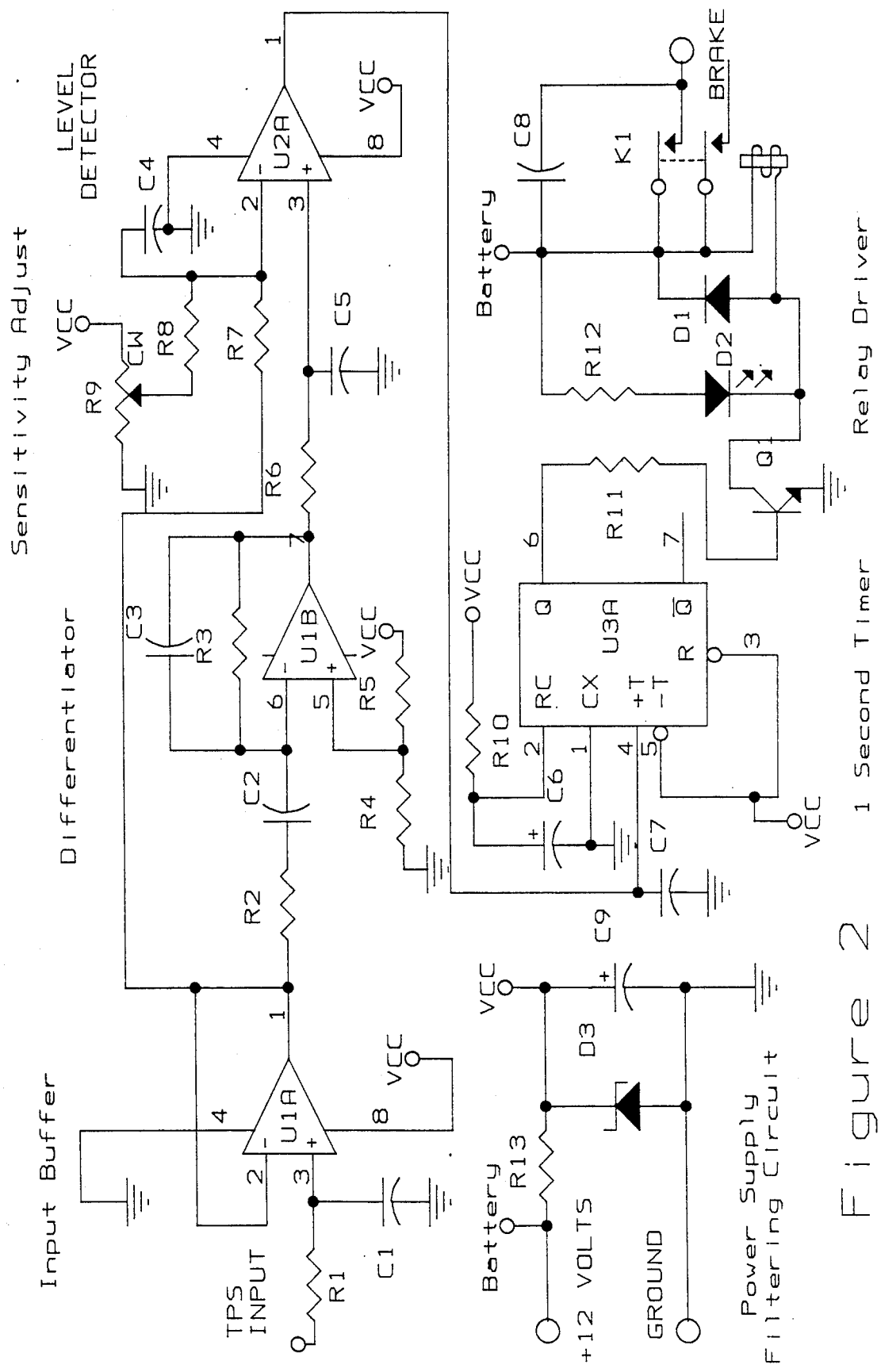
FIG. 2 one hardware implementation of the preferred embodiment.

FIG. 2 illustrates circuitry of the preferred embodiment. Input buffer 201 is comprised by op-amp U1A and low pass filter R1-C1. R1-C1 filters out electromagnetically induced noise and vibration effects which might otherwise trigger the device. The output of U1A is connected to differentiator 202, comprising R2-R5, C2, C3, and U1B. The output of U1B is applied to the input of level detector 204 where it is filtered by low pass filter R6-C5, and then applied to pin 3 of U2A. A comparison voltage is applied to pin 2 from sensitivity adjust 203. The comparison voltage is generated by potentiometer R9. R7, R8, and C4 are optional, as earlier described. They comprise a voltage divider and sample/hold combination. The relative ratio between R7 and R8 determines how much throttle angle compensation is provided C4 adds sufficient delay in voltage change that the differentiator output is compared with the signal which was present prior to the change which produced the differentiator output. In other words, a constant throttle angle will produce a constant voltage output from U1A and an output midway between $V_{cc}$ and ground from U1B. When the throttle CTS-641, Throttle Position Sensor Advanced Brake Light Device angle changes, U1B responds very quickly with a voltage swing away from midway, either towards ground or towards $V_{cc}$. However, the voltage impressed upon C4 remains relatively constant at some sensitivity adjusted throttle angle compensated level. Therefore, any rapid throttle angle change is compared with a voltage reference present just prior to the change.

One second timer 205, illustrated by U3A, R10, C6, and C7 is a standard circuit referencable throughout the literature, as is relay driver 205 and power supply filtering circuit 207.

The preferred embodiment of the present invention is fully implementable out of view of passengers. Therefore, no distasteful alterations to the passenger compartment are required. In operation there should be no indication of the presence of the device to the passengers. However, trailing vehicles are provided precious extra warning. With electronic implementation using few or no moving parts, in the preferred embodiment the relay and adjustment potentiometer R9, the reliability of the device is excellent. Where sensitivity adjust R9 is not utilized, the entire device may be implemented without moving parts through electronic switching as is known in the art. The throttle position sensor provides all of the necessary information to the device, leaving nothing to get tangled in the accelerator linkage. Electrically connected accelerators using an accelerator position sensor provide equivalent information for operation of the circuitry. Installation involves a very limited number of electrical connections all in parallel with existing wiring, resulting in a user installable device whereby improper installation does not seriously risk the safety of the motorist, as it would with many of the prior art devices. Finally, the sensitivity adjust 203 is provided to adapt the device to the characteristics of the individual motorist. CTS-641, Throttle Position Sensor Advanced Brake Light Device While the foregoing is intended to describe what the applicants believe to be the preferred embodiment of the present invention, there is no intention to limit the breadth or scope of the invention. Rather, the foregoing is provided in accordance with what the applicant believes to be the best mode and embodiment of the invention. For example, the invention be manufactured with a variety of designs and packaging schemes for either oen or aftermarket applications. Similarly, the invention would be equally applicable to electric cars and to railway vehicles The full scope of the invention is set forth hereinbelow in the claims. CTS-641, Throttle Position Sensor Advanced Brake Light Device

Having thus described our invention, we claim:

1. A method for signalling a rapid deceleration of an engine powered means for motion comprising the steps of:

monitoring a first amount of demand for said engine power;

converting said first amount of demand into a first voltage substantially proportional to a rate of change of said first amount;

providing a reference voltage;

adjusting said reference voltage with a second CTS-641, Throttle Position Sensor Advanced Brake Light Device voltage substantially proportional to said first amount of demand to thereby produce an adjusted reference voltage;

delaying changes in said adjusted reference voltage relative to changes in said first voltage to produce a delayed adjusted reference voltage;

comparing said delayed adjusted reference voltage with said first voltage to provide a result;

initiating the lighting of a signal responsive to said result.

2. An advanced brake light signalling device, suited for use in a vehicle comprised by brake lights and an engine, comprising:

a potentiometric means for producing a first voltage representative of a demand for engine power;

an input buffer means for receiving said first voltage and producing a similar second voltage;

a differentiator means for producing a third voltage, said third voltage having an amplitude waveform substantially representative of a mathematical derivative of a second voltage amplitude waveform;

a reference source which has an output a first reference voltage;

a level detector means which has as input said third voltage CTS-641, Throttle Position Sensor Advanced Brake Light Device and said reference voltage and said second voltage, said level detector means producing a fourth voltage indicative of a rapid decrease in demand for engine power, said fourth voltage determined in part by an amplitude of said second voltage at a time prior to said rapid decrease in engine power demand;

a lighting means for receiving said fourth voltage and responsive thereto lighting said brake lights.

3. The signalling device of claim 2 wherein said lighting means maintains said brake lights in a lit condition for a predetermined minimum time.

* * * * *